F. B. MILES & J. LAWRENCE.

Improvement in Machines for Making Nails.

No. 5,152. Reissued Nov. 19, 1872.

WITNESSES. Harry Smith
Thomas McIlvain

F. B. Miles,
and J. Lawrence
by their Attys
Howson and Son.

AM. PHOTO-LITHOGRAPHIC CO. N.Y. (OSBORNE'S PROCESS.)

UNITED STATES PATENT OFFICE.

FREDERICK B. MILES AND JOHN LAWRENCE, OF PHILADELPHIA, PENNSYLVANIA, ASSIGNORS TO JOHN LAWRENCE.

IMPROVEMENT IN MACHINES FOR MAKING NAILS.

Specification forming part of Letters Patent No. 129,156, dated July 16, 1872; reissue No. 5,152, dated November 19, 1872.

DIVISION A.

*To all whom it may concern:*

Be it known that we, FREDERICK B. MILES and JOHN LAWRENCE, both of Philadelphia, county of Philadelphia, State of Pennsylvania, have invented certain Improvements in Cut-Nail Machines, of which the following is a specification:

Our invention consists of certain improvements, too fully explained hereafter to need preliminary description, in automatic plate-feeding mechanism for cut-nail machines.

Figure 1:
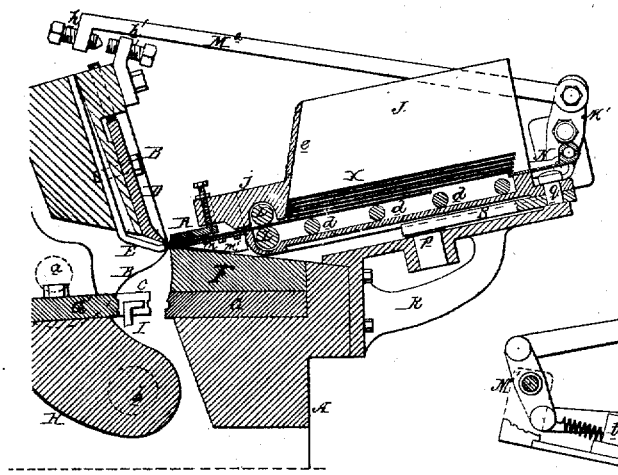
Figure 4:
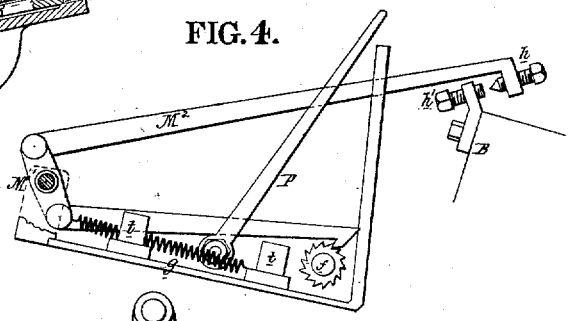
Figure 3:
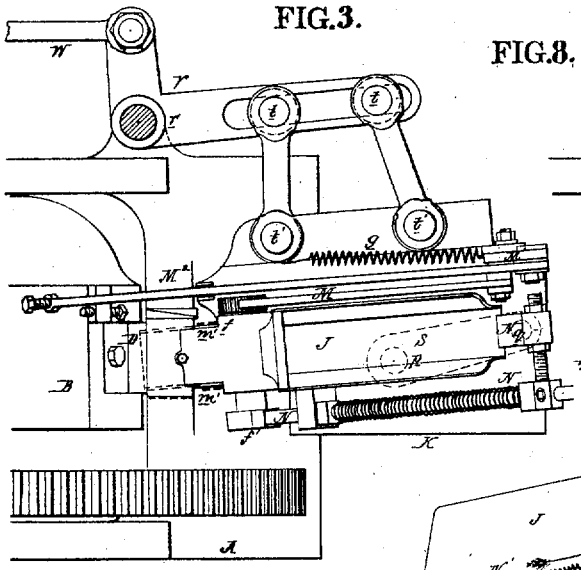
Figure 7:
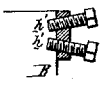
Figure 6:
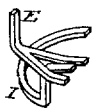
Figure 2:
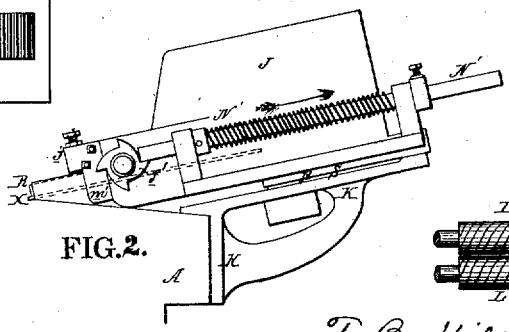
Figure 5:
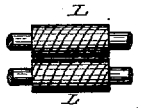

In the accompanying drawing, Figure 1 is a sectional view of part of a cut-nail machine with our improvements; Fig. 2, an exterior view of part of the same; Fig. 3, a plan view; Fig. 4, a view of the devices for operating the plate-feeding rolls; Figs. 5, 6, and 7, detached views of parts of the machine; and Figs. 8 and 9, diagrams illustrating the feed-box motion.

A represents a portion of the fixed frame of the nail-machine; and B, the cutting-lever turning upon the fulcrum *a*, and carrying the movable cutter D and gage E for holding the nail-blank after it is severed from the plate. (See Figs. 1 and 3.) F is the fixed cutter contained within a recess of the frame and resting upon the fixed griping-die G, the movable die G′ being secured to a lever, H, which has its fulcrum at *b*. The spring-nipper I, Fig. 1, which takes the nail-blank from the gage E and holds it against the fixed griping-die until the die G′ has moved forward, is secured at one end to the fixed frame, projects upward into a recess, *c*, of the movable griping-die, and is, together with the cutter-head and griping-lever, operated by cams on a shaft, not shown in the drawing, but common to most nail-machines, and fully illustrated in the patent granted to F. Davison, October 31, 1871. The guide E is forked in the manner plainly shown in Fig. 6, so that it may guide and hold the tapering nail-blanks, first at one side and then at the other, until they are introduced into the groove of the fixed griping-die G, and so as also to enable the spring-nipper I to be moved forward to a position between the forked ends of the said guide in order to take the blank from and enable the latter to be raised. The feed-box J, to which our invention particularly relates, is supported in an inclined position partly by the fixed cutter F and partly by a bracket, K, secured to the fixed frame, and the said box, in order that it may properly feed the plates, has a peculiar combined lateral and longitudinal vibratory movement imparted to it in a manner and by devices which will be fully described hereafter. The feed-box is open at the top and back, and is made of sufficient capacity to receive a pile of nail-plates, X, the lowermost of which rests upon a series of small rollers, *d*, extending across and turning freely within the box, while the front ends of the said plates bear against and are retained in position by the inclined front *e* of the said box. The lowermost plate of the pile is carried forward to the cutters by geared feed-rollers L L, the spindle of the uppermost of which has at one end a ratchet-wheel, *f*, Figs. 3 and 4, operated at intervals by a pawl, M, secured to one arm of a lever, $M^1$, which is vibrated in one direction by a spring, *g*, and in the opposite direction by a rod, $M^2$, which extends over the cutter-head B, and is struck by and operated at every upward motion of the latter. The extent of the movement of the rod $M^2$, and consequently that of the pawl M and feed-rollers, is determined by the set-screws *h* and *h′* on the said rod and cutter-head, which can be adjusted toward and from each other, as desired. (See Figs. 1 and 4.) As the rod $M^2$ is moved laterally with the vibrating feed-box across the cutter-head, it is necessary to provide the latter with two set-screws, *h′*, to operate alternately upon the set-screw *h* of the said rod. (See Fig. 7.) In order that the feed-rollers L may draw the plates forward without slipping over the same, it is necessary that their surfaces should be serrated or roughened, and we have found that the most advantageous method of thus preparing the rolls is to cut them spirally, as shown in Fig. 5, as this prevents the jerking forward of the plates, which is apt to be caused by the intermittent movement of the rollers. It will be understood that the tendency of the spiral serrations of the upper roll to move the plate laterally in one direction will be counteracted by the tendency of the serrations of the lower roll to move it in the opposite direction. In addition to the feed-rollers L there is also a supplementary feeding device at the rear of the box, consisting of a plate, N, (Figs. 1 and 2,) secured to a sliding spring-bar, N′, adapted to guides on the side of the box, and caused, by its spring, to bear constantly against a cam-wheel, *f′*, on the spindle of the upper feed-roller L. This cam-wheel forces the spring-bar and plate N rearward in the direction of the arrow, Fig. 2, and then releases the same, so as to permit the feed-plate to move suddenly forward against the rear end of the undermost plate of the pile in the box, and thus thrust it forward to the feed-rolls L, so that the said plate may be seized by the latter and carried forward to the cutters. This supplemental feed operates constantly, or at regular intervals, so as to thrust the plates forward successively to the feed-rolls as they drop into its path, in consequence of the consumption of those which have been previously carried forward. The whole feed can be instantly thrown off without stopping the machine by means of a cam-lever, P, Fig. 4, hung to the side of the feed-box, and arranged, when operated, to lift the pawl M from between the teeth of the ratchet-wheel *f* on the spindle of the upper feed-roll. This will stop the motion of the feed-rolls, and consequently that of the supplemental feed N, which derives its motion from the said feed-rolls.

In the aforesaid patent of F. Davison the nose of the feed-box was carried as close as possible up to the cutters, and the plate fed directly from the same to the latter; but we have found, in experimenting with this box, that in consequence of the lateral swinging movement which it is necessary to impart to the box in order to give the proper taper to the nail-blanks the nose of the box is, during the movement, unavoidably drawn back from the cutter, so that when the plate is nearly consumed the descending cutter frequently withdraws the same from the box, bends it upward, and otherwise distorts and destroys the remnant of the plate, from which, if properly held, at least two more nails could be made. We have overcome this difficulty by cutting away the upper portion of the nose of the box and substituting for the same a metal block, R, which is rigidly secured to the fixed frame as close as possible to the cutter, and which retains and prevents the possibility of the throwing up of the last portion or remnant of the nail-plate, owing to the pressure of the same upon the cutter. The nail-plates are held up against this block by a flat spring, *m*, which forms the bottom of the nose of the feed-box, and extends forward beneath the said block, and any lateral play of the nail-plate is prevented by the springs *m′*, Figs. 3 and 8, which form the side of the nose of the feed-box. These springs *m* and *m′* are capable of longitudinal adjustment upon the box, and they serve to retain the plates with sufficient firmness; but are at the same time capable of yielding to slight inequalities in the width or thickness of the same.

We will now proceed to describe the feed-box motion, which is one of the most important features of our invention.

For automatically feeding plates to the cutters of a nail-machine, it is necessary that the box should be inclined first in one direction and then in the other, so as to present the plates to the cutters at such an angle as to form blanks of the proper taper, and so that the widest ends of the tapering blanks shall be presented alternately toward the heading-dies at the opposite sides of the machine. It is also necessary that the whole box should be moved laterally as well as inclined, so that the wide ends of the blanks may project from the griping-dies, first on one side and then on the other, in order that sufficient of each blank may be presented to form the nail-head. We have also found it advisable to impart to the box, in addition to the above movements, sufficient longitudinal motion to enable the cut end of the plate to be drawn back from the movable cutter so as not to strike or rub against the latter during the lateral movement and reversing of the angle of the box.

Figure 8:
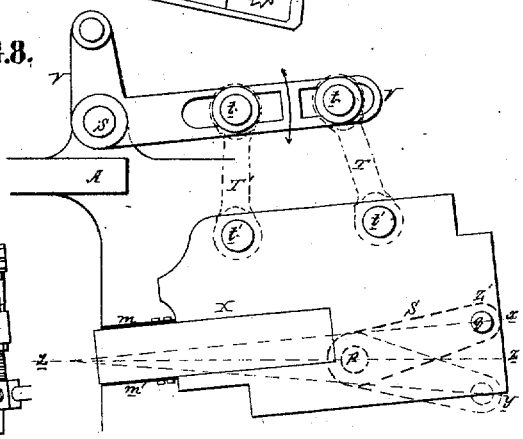

This compound movement of the feed-box is obtained through the medium of the devices shown in Figs. 3 and 8, which we will now proceed to describe. The box is connected to the fixed bracket K through the medium of a radial link, S, hinged to the bracket at *p*, and pivoted to the rear of the box by a bolt, *q*, and the said box is connected at one side by two links, T T′, to the slotted arm *r* of a bell-crank lever, V, hung to the fixed frame at the point *s*, and operated by a cam on the cam-shaft, with which it is connected by a rod, W. The link S, through the medium of which the box is connected to the fixed bracket, permits the box to be moved laterally to any desired extent, and to be inclined to any angle in respect to the cutters, and it also causes the box to be drawn back from the latter, owing to the curve described by the rear end of the link when the said box is moved from one of its extreme positions to the other. The links T T′ transmit the movements of the lever V to the box, retain the latter in its proper position, and determine the extent of its lateral movement and the angle to which it is to be inclined.

Figure 9:
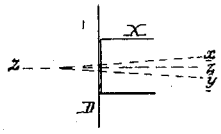

The compound movement of the box will be readily understood on reference to the diagrams, Figs. 8 and 9, where *x* represents the center line of the box when at the limit of its movement in one direction; *y*, the center line when it has reached the limit of its movement in the opposite direction; *z*, the center line when the box is midway between these two positions and at right angles to the face of the cutter; and *z′*, the arc described by the rear end of the box at the point where it is hinged to the radial link S.

On the movement of the lever V in the direction of the arrow, Fig. 8, the box will be moved laterally in the same direction; and at the same time, owing to its being controlled by the link S, and to the arc of a circle in which the rear end of the said link moves, the box must necessarily be drawn back to an extent proportionate to the length of the radius of the arc until it reaches the position indicated by the line *z* and shown by full lines in Fig. 9; and on continuing the motion in the same direction the box will still be moved laterally, and at the same time moved forward to the cutters and turned to the angle indicated by the line *y*. When the lever V is moved in the contrary direction the same compound movement will be imparted to the box, but in a reverse direction.

The longitudinal movement of the box, it should be understood, is not for the purpose of feeding the nail-plate, but merely to draw back the cut end of the latter sufficiently to enable it to clear the movable cutter during the reversing of the box, and to prevent the shaving off of portions of the nail-plate by the cutter during the movement of the latter, acquired by the momentum, after the machine has been stopped. The extent of the lateral throw and inclination of the box is dependent upon the position of the connecting-points of the links T T′ and arm *r* of the operating-lever. The said arm is therefore slotted, so as to enable the links to be adjusted upon the same. This forms a ready means of regulating the movement of the box to accord with the length and taper of the nails to be produced, and is an important feature of the machine.

It will be observed that the pins *t′* on the box, to which the links T are connected, are permanent, while the pins *t* are adjustable on the vibrating arm *r*. The nearer the pin *t* of the link T is adjusted to the fulcrum of the bell-crank lever V the less will be the vibratory movement of the outer end of the box, and the further the pin of the other link T′ is adjusted from the said fulcrum the greater will be the vibration at the inner end or nose of the box. Hence, by the adjustment of these pins *t* the extent of the vibration at either end of the box can be varied at pleasure within certain limits; and, consequently, the end of the nail-plate held by the box may be made to assume any required angle in respect to the cutting-knife; and blanks of different tapers can be cut by the said knife, according to the character of the nail to be produced. Not only is this important end attained by the differential mechanism described, but the lateral movement of the entire box causes the exposure and projection from between the griping-dies of sufficient of the blanks to enable the latter to be headed first on one side and then on the other.

It is not absolutely necessary that the pins *t′*, by which the links are connected to the side of the box, should be fixed, as these pins, as well as the pins on the vibratory arm *r*, might be rendered adjustable; and in some instances the latter pins might be fixed, and the required adjustments be made with the pins *t′* only.

As it is often necessary to lift the feed-box bodily from the machine, it is important that its connections should be readily detachable, so as to enable it to be thus removed without loss of time. The links T are therefore merely fitted to the pins *t t′*, from which they can be lifted, after which it is only necessary to withdraw the bolt *q* in order to entirely detach the box.

We claim as our invention—

1. The combination, with the nail-plate box and arm or lever V for operating the same, of links T T′, which are adjustable on the said arm in a direction parallel, or thereabout, to the side of the box, for the purpose described.

2. A nail-plate box, to which the combined lateral vibrating motion is imparted, as set forth, in combination with the radial link S, for controlling the box longitudinally, substantially as described.

3. The feed-box, connected to the links T T′ and S by pins *t t′* and a bolt, *q*, substantially in the manner described, so as to permit the said links to be instantly detached from the box when it becomes necessary to remove the latter from the machine.

4. The combination of the overlapping plate or block R with the springs *m* and *m′*, which form the bottom and sides of the nose of the feed-box.

5. The feeding-rolls L L, cut spirally, substantially as described, and as shown in Fig. 5.

6. The combination of the feed-rolls of the nail-box, ratchet *f*, lever $M^1$, pawl M, arm $M^2$, and the reciprocating cutter-head.

7. The combination of the said lever $M^2$ and its set-screw *h* with the two set-screws *h′* on the cutter-head.

8. The combination, with the feed-rolls, of the supplemental feed N N′, acting in conjunction with and operated by the said feed-rolls, substantially as herein described. (See Figs. 1, 2, and 3.)

9. The forked gage E, secured to the cutter-head and operating in conjunction with the spring-nipper I and griping-dies, substantially in the manner described. (See Fig. 6.)

In testimony whereof we have signed our names to this specification in the presence of two subscribing witnesses.

FREDK. B. MILES.
J. LAWRENCE.

Witnesses to the signature of F. B. MILES:
J. SHERBORNE SINGER,
O. C. FERRIS.

To the signature of JOHN LAWRENCE:
WM. A. STEEL,
HUBERT HOWSON.